US012715058B2

(12) United States Patent
Glaze et al.

(10) Patent No.: US 12,715,058 B2
(45) Date of Patent: Aug. 25, 2026

(54) TUBE CUTTER FOR CUTTING A ROUND TUBE AND METHOD FOR CUTTING A ROUND TUBE TO LENGTH

(71) Applicant: CONEX IPR LIMITED, Kingswinford (GB)

(72) Inventors: Alan Glaze, Kingswinford (GB); Grzegorz Klinski, Kingswinford (GB); Richard Leigh, Kingswinford (GB); Manouchehr Salehi-Bakhtiari, Kingswinford (GB)

(73) Assignee: CONEX IPR LIMITED, Kingswinford (GB)

( * ) Notice: Subject to any disclaimer, the term of this patent is extended or adjusted under 35 U.S.C. 154(b) by 44 days.

(21) Appl. No.: 18/559,541

(22) PCT Filed: May 11, 2021

(86) PCT No.: PCT/EP2021/062544
§ 371 (c)(1),
(2) Date: Nov. 7, 2023

(87) PCT Pub. No.: WO2022/237972
PCT Pub. Date: Nov. 17, 2022

(65) Prior Publication Data

US 2024/0278340 A1 Aug. 22, 2024

(51) Int. Cl.

| | |
|---|---|
| ***B23D 21/08*** | (2006.01) |
| ***B26D 1/157*** | (2006.01) |
| ***B26D 3/16*** | (2006.01) |

(52) U.S. Cl.
CPC ............ *B23D 21/08* (2013.01); *B26D 1/157* (2013.01); *B26D 3/166* (2013.01)

(58) Field of Classification Search
CPC ...... B26D 7/27; B26D 7/0683; B26D 7/0006; B26D 7/2635; B26D 3/1666; B26D 3/16;
(Continued)

(56) References Cited

U.S. PATENT DOCUMENTS

| | | | |
|---|---|---|---|
| 3,196,652 | A | 7/1965 | Meese |
| 4,126,064 | A | 11/1978 | Tarrant |

(Continued)

FOREIGN PATENT DOCUMENTS

| | | | | |
|---|---|---|---|---|
| DE | 102011051711 A1 * | 2/2012 | ............ | B23D 21/08 |
| DE | 102019112363 A1 * | 11/2020 | ............ | B23D 23/00 |

(Continued)

OTHER PUBLICATIONS

Translation DE102011051711 (Year: 2025).*

(Continued)

*Primary Examiner* — Nhat Chieu Q Do
(74) *Attorney, Agent, or Firm* — Foley & Lardner LLP

(57) ABSTRACT

The invention relates to a tube cutter (1; 1.1) for cutting a round tube (100). The tube cutter (1; 1.1) comprises a main body (2; 2.1), a cutting device (3) assigned to the main body (2; 2.1), and a rotary guide (4) for the main body (2; 2.1). The rotary guide (4) is designed to rotatably receive the round tube (100) in order to allow for a rotation of the tube cutter (1; 1.1) about the central axis (110) of the round tube (100) along its outer circumference (120). The cutting device (3) has a cutting part (5) with a blade (6) lying in a cutting plane (7) and is designed such that, with a rotation of the tube cutter (1; 1.1) about the round tube (100), the blade (6) executes a circumferential cut (400) in the cutting plane (7). In the tube cutter (1; 1.1), at least one forming element (8) is also provided, which protrudes into the cutting plane (7) or is positioned at least in the cutting plane (7) and is designed such that, with the rotation of the tube cutter (1; 1.1) about the round tube (100), it acts in a forming manner on the outer circumference (120) of the round tube (100), in order to form a bevel (131; 141) at an end of at least one of the tube parts (130, 140), created by the cut (400) of the blade (6), by means of material displacement. The invention (Continued)

also relates to a method for cutting a round tube (100) to length.

20 Claims, 13 Drawing Sheets

(58) Field of Classification Search
CPC .. B26D 21/08; B26D 1/157; B26D 2007/013; B21D 17/04
USPC .............................................................. 83/54
See application file for complete search history.

(56) References Cited

U.S. PATENT DOCUMENTS

| | | | |
|---|---|---|---|
| 4,831,732 | A | 5/1989 | Garton |
| 6,666,062 | B2 | 12/2003 | Dole et al. |

FOREIGN PATENT DOCUMENTS

| | | | |
|---|---|---|---|
| EP | 0 154 616 | A2 | 9/1985 |
| WO | WO-2020/228903 | A1 | 11/2020 |

OTHER PUBLICATIONS

International Search Report and Written Opinion dated Feb. 22, 2022, for application No. PCT/EP2021/062544.
International Preliminary Report on Patentability dated Apr. 24, 2023, for application No. PCT/EP2021/062544.

* cited by examiner

-- Prior Art --

-- Prior Art --

-- Prior Art --

16'
20
R
Q
16
Y
Z
15'
8, 32'
1301'
1301''
8, 32
1301
15
1301
X 20
8, 22
A
A
8, 32
10
10
12
12
11
11.1
11.1'
13
44
2
14

TUBE CUTTER FOR CUTTING A ROUND TUBE AND METHOD FOR CUTTING A ROUND TUBE TO LENGTH

CROSS-REFERENCE TO RELATED PATENT APPLICATIONS

This application is a U.S. National Stage Application Under 35 U.S.C. § 371 of International Patent Application No. PCT/EP2021/062544, filed May 11, 2021, the contents of which are incorporated herein by reference in its entirety.

BACKGROUND OF THE INVENTION

The invention relates to a tube cutter for cutting a round tube having a main body, a cutting device assigned to the main body, and a rotary guide for the main body.

Such tube cutters are used, for example, in installation technology and serve to cut metal tubes to length such as, for example, copper tubes or stainless steel tubes. The tube cutters typically have one or more cutting wheels, which are guided multiple times under pretension over the course of a cutting process, in order to guide the tube to be cut. This causes material displacement in a contact region between the cutting wheel and the tube to be cut until the tube has been completely separated.

SUMMARY

One object of the invention is to propose at least one option for optimizing a tube cutter of the aforementioned type, particularly with respect to a cutting area generated during cutting of the tube.

The object is achieved with a cutting device which has the features of claim 1. In order to achieve the object, a method is also proposed. Advantageous embodiments and/or designs and/or aspects of the invention result from the dependent claims, the following description, and the figures.

A fundamental tube cutter for cutting a round tube comprises a main body, a cutting device assigned to the main body, and a rotary guide for the main body. Preferably, the rotary guide is designed to rotatably receive the round tube in order to allow for a rotation, particularly a guided rotation, of the tube cutter about the central axis of the round tube along its outer circumference. Preferably, the cutting device has a cutting part with a blade lying in a cutting plane and is designed such that, with the or a rotation of the tube cutter about the round tube, the blade executes a circumferential cut in the cutting plane. Due to such a tube cutter, a separation of the round tube is achieved in that the tube cutter is guided about the outer circumference of the round tube and, in doing so, the blade is positioned in cutting contact with the outer circumference of the cutting tube.

The term "round tube" should be understood in the present description as particularly being a tube with a round cross-section in order to accommodate it in the rotary guide of the tube cutter and to enable rotation of the tube cutter as relates to the tube. For example, the round tube has a circular cross-section. For example, the round tube is a metal tube, particularly a copper tube, or a stainless steel tube, or a tube comprising carbon steel.

In one embodiment, the tube cutter further comprises at least one forming element, which penetrates into the cutting plane or is at least within the cutting plane and is particularly designed, during the or a rotation of the tube cutter about the round tube, to act in a forming manner on the outer circumference of the round tube, in order, for example, to form a bevel or another type of contour, such as, for example, a fillet, at an end of at least one of the tube parts created by the cut of the blade, by means of material displacement.

A measure is thereby undertaken to counteract any burrs in the cutting area as early as the cutting process and immediately form the end of the cut tube part to the extent that the mounting of sealing rings is supported and facilitated. In particular, this counteracts any damage to the sealing rings, the occurrence of which is facilitated when there is a burr in the cutting area. With the tube cutter, the process of de burring is executed as early as the cutting process. No further work steps for the user are necessary in this regard. Due to the forming by means of the forming element, a chip-free deburring process is also enabled. This is also an aspect which facilitates a high degree of leak-tightness when using the cut tube together with seals, because interfering chips are prevented.

In a further embodiment, the at least one forming element is located separately from the cutting part. In particular, the at least one forming element is arranged spatially separate from the cutting part. Due to such decoupling of the forming element from the cutting part, a measure is undertaken to enable use of the tube cutter with round tubes having different wall thicknesses. For such cases, the decoupling of the forming element from the cutting part facilitates improved process reliability when machining the round tube.

The at least one forming element may have a rotation-symmetrical contour as relates to an axis of rotation. This facilitates a uniform or even forming of the end of the at least one cut tube along the outer circumference, particularly when the forming element is rotatably mounted, i.e. it can roll off of the outer circumference of the round tube. For example, the forming element is a forming roller.

In one possible embodiment, the tube cutter comprises a forming element spring, and particularly the at least one forming element is designed to be moved, particularly displaced, from a starting position in the receiving area for the round tube, due to the force of the forming element spring. This means that, due to the force of the forming element spring, the at least one forming element exerts a forming force when the round tube is positioned in the receiving area. This is effected, for example, in that the forming element spring is moved out of the starting position due to the round tube in the receiving area, and thereby the forming element spring can establish a reset force which then acts as a forming force on the round tube. For example, the round tube is retained in the receiving area when the cutting part acts on the outer circumference of the round tube, for example, in order to execute a cut in the cutting plane.

In particular, it is provided that the at least one forming element is retained in the starting position due to a pretension force of the forming element spring. This counteracts any rattling of the at least one forming element when there is not a round tube in the receiving area, i.e. no round tube is accommodated in the rotary guide.

A positioning element may be provided, which exerts a positioning force onto the forming element spring in order to adjust the force of the forming element spring to a predefined value as relates to the starting position of the at least one forming element. This enables adjustment to a defined spring force in the starting position, and thus an impact can be made on the type and manner and/or strength of the forming effected by the forming element on the round tube. The positioning element may be a screw element, which can be placed more or less into a state of pretension as relates to the main body by means of tightening or loosening. The forming element spring is formed, for example, as a leaf spring. In this case, the positioning elements can act in an adjusting manner on a section of the leaf spring.

One potential embodiment exists in that the tube cutter comprises a sliding guide. In particular, the sliding guide is designed to enable a preferably guided movement of the at least one forming element as relates to the main body in order to move the at least one forming element out of the starting position against the force of the forming element spring.

The tube cutter may comprise a stop in order to establish or set, for example, the starting position of the at least one forming element. For example, the at least one forming element would be positioned up against the stop in the active position in this case when the at least one forming element is in the starting position or has reached the starting position. For example, the starting position is present when there is no round tube in the rotary guide.

The tube cutter may comprise a stop or a further stop in order to establish or set, for example, an extended position of the at least one forming element. For example, the at least one forming element would be positioned up against the stop or the further stop in the active position in this case when the at least one forming element is in the extended position or has reached the extended position. The at least one stop means that the movement is limited, particularly the displacement of the at least one forming element. For example, the at least one stop is assigned to the sliding guide. For example, the at least one stop is formed by a section of a guide surface of the sliding guide.

In one embodiment, the sliding guide has at least one guide element which can be moved along a guide surface. In particular, it is provided that the at least one forming element is arranged, particularly rotatably mounted, on the at least one guide element. In particular, it is further provided that the guide surface is assigned to the main body or a sliding part assigned to the main body, particularly is arranged and/or molded or shaped on the main body or the sliding part. In particular, it is further provided that the at least one guide element is supported as relates to the forming element spring, particularly is supported against the forming element spring, for example supported directly and/or proximately.

For example, the at least one forming element is rotatably mounted on the sliding part and can be displaced, preferably radially, against the force of the forming element spring, along the or a guide surface of the link, particularly can be displaced radially against the round tube, for example in order to exert a counter-force, as a forming force, against a cutting force effected by the blade.

In a further or other embodiment, the tube cutter comprises at least one support part, on which the at least one forming element is arranged, particularly rotatably arranged or mounted. In particular, it is provided that the at least one support part is movably guided over the sliding guide on the main body. In particular, it is further provided that the at least one support part is supported on the forming element spring via a contact point and/or linking point, particularly a single linking point or contact point. For example, the linking point or contact point is formed by a ridge or an edge or another material contour and is assigned, for example, to the at least one support part, particularly is formed thereupon.

It may be provided that the sliding guide has at least one, preferably two, guide elements, each of which can be moved along a guide surface. It may be further provided that the guide elements are assigned to the at least one support part, particularly are arranged and/or molded thereupon, and the corresponding guide surfaces are assigned to the main body, particularly are arranged and/or molded or shaped thereupon. Alternatively, the guide elements may be assigned to the main body, particularly arranged and/or molded thereupon, and the corresponding guide surfaces may be assigned to the at least one support part, particularly arranged and/or molded or shaped thereupon. Furthermore, it is particularly provided that the at least one forming element is arranged between the guide elements.

For example, the guide element or the respective guide element is formed as a pin element or similar cylinder element. For example, the guide surface or the respective guide surface is formed by a wall section of a round hole or longitudinal hole, into which the guide element is inserted and/or protrudes.

A further embodiment exists in that the rotary guide has at least one, preferably at least two, support rollers, which are preferably arranged, particularly are rotatably arranged, on the main body. In particular, the at least two support rollers extend with their axial extension transverse as relates to the cutting plane. When viewed in the direction transverse as relates to the cutting plane, the at least two support rollers are arranged, for example, one after the other. For example, the at least one forming element, which is arranged, for example, coaxially or axially offset as relates to the at least two support rollers, is arranged between the at least two support rollers It may be provided that the at least two support rollers have outer diameters which are equivalent to each other and are positioned, for example, on a common axis of rotation. It may further be provided that the at least one forming element is positioned with its axis of rotation on the common axis of rotation, for example when the at least one forming element is positioned in the starting position. Furthermore, it may be provided that the at least one forming element has an outer diameter which is at least partly greater than the outer diameter of the at least two support rollers when viewed in the direction of the axis of rotation of the at least one forming element.

In order to exert a forming effect onto the round tube, the forming element may have a preferably circumferential protrusion on its outer circumference. The protrusion may extend similarly or uniformly over the circumference. When viewed transversely as relates to the axial direction of the forming element, the protrusion may also have a symmetrical cross-sectional contour. This facilitates, for example, a formation of a bevel or curve on both cut tube parts in the same form or design.

For example, the at least one forming element is formed in the shape of a cylinder. For example, the at least one forming element is arranged with its axial extension transverse as relates to the cutting plane and has the protrusion, for example, as a pointy ridge. For example, the at least one forming element has a cylindrical axial extension outside of the protrusion. The at least one forming element can thereby exert a support effect onto a round tube accommodated in the rotary guide, for example when the round tube is separated and/or when the at least one forming element acts in a forming manner on an outer edge of at least one of the generated halves of the tube.

According to a further embodiment, at least two forming elements are provided, which penetrate into the cutting plane and are designed, during the or a rotation of the tube cutter about the round tube, to act in a forming manner on the outer circumference of the round tube, in order, for example, to form a bevel or another type of contour, such as, for example, a fillet, at an end of at least one of the tube parts created by the cut of the blade, by means of material displacement. This facilitates guidance of the round tube to the center, and it counteracts an undesired super-elevation of force on one side. The at least two forming elements are each formed, for example, as a forming roller.

It may be provided that the at least two support rollers of the rotary guide are present in pairs. In this case, it is appropriate that one of the at least two forming elements is arranged in between, said forming elements being positioned, for example, coaxially as relates to the corresponding support rollers when the at least two forming elements are positioned in the starting position. This facilitates minimizing the necessary spring path for the at least two forming elements for all the different tube diameters that may occur.

According to a further embodiment, the rotary guide works together with a single forming element, which is formed, for example, by the previously described at least one forming element. It has been shown that this facilitates achievement of a desired forming accuracy on the round tube.

In particular, the rotary guide is designed to rotatably receive round tubes with an outer diameter from a first size range in the receiving area. In a further embodiment, the tube cutter comprises at least one further rotary guide. In particular, the further rotary guide is designed to rotatably receive round tubes with an outer diameter from a second size range in a further receiving area. Preferably, the tube cutter further comprises a further forming element, which penetrates into the cutting plane or is at least within the cutting plane and is designed, during a rotation of the tube cutter about a round tube accommodated in the further rotary guide, to act in a forming manner on the outer circumference of the round tube, in order to form a bevel or another type of contour, such as, for example, a fillet, at an end of at least one of the tube parts created by the cut of the blade, by means of material displacement It may be provided that the rotary guide and the further rotary guide each have an additional support roller. It may further be provided that the additional support rollers are each rotatably mounted on the main body about an axis of rotation, and the axes of rotation extend transversely as relates to the cutting plane. As viewed in the direction transverse as relates to the cutting plane, the axis of rotation of the further forming element and the axis of rotation of the additional support roller of the further rotary guide are arranged, for example, spaced apart from one another, and the axis of rotation of the forming element and the axis of rotation of the additional support roller of the rotary guide are arranged in between spaced apart from one another. In this form and manner, the rotary guide and the further rotary guide and the respectively corresponding forming element are arranged such that both the round tubes of the first size range and the round tubes of the second size range can be cut with the same cutting device, and the outer edges of the halves of the tube can be formed, particularly beveled Furthermore, it may be provided that the cutting device has a feed unit in order to displace the cutting part, as relates to the main body, in the direction of a receiving area for the round tube, particularly to set or reset the position of the blade. The feed unit may be actuatable by hand or actuated by hand. To this end, a handle part may be provided on the feed unit. In particular, it may be provided that the tube cutter has a handle in order to guide the tube cutter by hand during cutting of the round tube. The handle may be a grasping section on the main body.

One possible embodiment consists in that the feed unit comprises a spindle drive, which is assigned to the main body and to which the cutting part is guided by hand, in a displaceable manner, in order to move the cutting part in the direction of the receiving area for the round tube, particularly to set or reset the position of the blade. The cutting part may comprise a cutting wheel, which forms the blade and is rotatably movable, for example, in order to roll it off of the outer circumference of the round tube in a cutting manner. For example, the cutting wheel is rotatably movable as relates to the main body and/or the feed unit. For example, the cutting wheel is mounted in a rotatably movable manner on the feed unit.

The proposed embodiments facilitate a positionally-accurate forming of the outer edge of at least one of two halves of the tube autonomously during the cutting process, in which a round tube is separated into the two halves of the tube. To this end, a forming element spring and/or a sliding guide can be used in the previously described form and manner.

Suitably, the tube cutters described herein include a rotary guide comprising a ridged surface capable of forming a witness marking on a round tube during the cutting operation, for example, wherein said ridged surface is capable of forming a line marking, a scratch marking, a dotted marking or a knurled marking. This advantageously enables the engineer to verify that the cut tube is correctly positioned within a fitting, or connector, such as in a compression fitting.

In one aspect the present invention provides a tube cutter for cutting a round tube as described herein, wherein the rotary guide comprises at least two support rollers, preferably parallel to each other, and at least one forming roller, wherein the at least two support rollers are rotatably mounted on the main body; wherein the at least two support rollers are mounted on biasing means, and said at least two support rollers are movable from respective starting positions (X and Y) and wherein each of said at least two support rollers extend into the receiving area, at least partially beyond an outer diameter of the at least one forming roller when in said starting positions (X and Y). For example, when the biasing means is (or are) spring(s) such as compression springs, the at least two support rollers extend into the receiving area at least partially beyond an outer diameter of at least one forming roller, when the springs are not compressed (or for example, when a low compression force is applied). However, when a greater force is applied to the at least two support rollers, they can move such that the forming roller can act in a forming manner on the round tube, as described herein.

The present invention provides a tube cutter for cutting a round tube comprising a main body, a cutting device assigned to the main body, and a rotary guide for the main body, wherein the rotary guide is designed to rotatably accommodate the round tube in a receiving area, in order to enable a rotation of the tube cutter about the central axis of the round tube along its outer circumference, wherein the cutting device has a cutting part with a blade lying in a cutting plane and is configured such that, with a rotation of the tube cutter about the round tube, the blade executes a circumferential cut in the cutting plane, and wherein the tube cutter further comprises at least one forming element, which protrudes into the cutting plane or is positioned at least in the cutting plane and is configured such that, with a rotation of the tube cutter about the round tube, it acts in a forming manner on the outer circumference of the round tube, in order to form a bevel or another type of contour at an end of at least one of the tube parts, created by the cut of the blade, by means of material displacement, wherein the at least one forming element is present separately from the cutting part, wherein the at least one forming element is a forming roller, wherein the tube cutter comprises at least one forming element spring, and the at least one forming element is configured to be moved out of a starting position (A) lying in the receiving area for the round tube, against the force of the at least one forming element spring, such that the at least one forming element exerts a forming force due to the force of the forming element spring, when the round tube is accommodated in the receiving area; wherein the rotary guide comprises at least two support rollers, preferably parallel to each other, wherein the at least two support rollers are rotatably mounted on the main body; wherein the at least two support rollers are mounted on biasing means, and said at least two support rollers are movable from respective starting positions (X and Y) and wherein each of said at least two support rollers extend into the receiving area, at least partially beyond an outer diameter of the at least one forming roller when in said starting positions (X and Y).

Suitably, the at least two support rollers are arranged with each of their axial extensions respectively transverse as relates to the cutting plane.

Optionally, the tube cutter comprises four support rollers.

Suitably, at least two support rollers are rotatably mounted on opposing sides of the cutting plane.

The at least two support rollers may be arranged to support a round tube accommodated in the receiving area by supporting adjacent cross-sectional quadrants of said round tube.

Suitably, at least two support rollers may be arranged to support a round tube in the receiving area by supporting the same cross-sectional quadrant of said tube.

Further suitably, at least one forming roller may be rotatably mounted between at least two support rollers.

Suitably, the tube cutter comprises two forming rollers.

The axis of rotation of at least one forming roller may lie within the diameter of for example at least two support rollers, which form a first set of support rollers.

The axis of rotation of at least one forming roller may lie within the diameter of each of at least two support rollers which form a first set of support rollers, and the axis of rotation of a second forming roller may lie within the diameter of each of at least two at least two support rollers which form a second set of support rollers. The first set of support rollers may be arranged to support one cross-sectional quadrant of said round tube, and the second set of support rollers may be arranged to support a second adjacent cross-sectional quadrant of said round tube.

Preferably the biasing means comprises a spring. For example, a compression spring.

Suitably, the spring is a helical spring, a spiral spring or a leaf spring.

Suitably, the force exertable by the at least one forming element spring on the at least one forming roller, is greater than the force exertable by the biasing means on the at least two support rollers. Each of the support rollers may be mounted on separate biasing means.

Alternatively, two support rollers may be mounted on a common (e.g. a single) biasing means. For example, two support rollers may be mounted on a single leaf spring element. The tube cutter may comprise four support rollers, wherein two support rollers are mounted on a first biasing means, and two support rollers are mounted on a second biasing means The tube cutter may have at least two support rollers mounted on the main body facing the cutting device, for example wherein a point of contact of the cutting device with a round tube accommodated in the receiving area is separate from the cross-sectional quadrants wherein said support rollers support said round tube.

The receiving area may be substantially C-shaped, V-shaped or Li-shaped in cross section. Preferably, the receiving area is substantially C-shaped in cross-section. The cutting device and support rollers may be substantially circumferentially disposed in a spaced apart manner about the receiving area.

In some embodiments, at least two support rollers may share a common axis of rotation. In such embodiments, the tube cutter may comprise two sets of said at least two support rollers wherein the at least two support rollers of the first set share a common axis of rotation, and the at least two support rollers of the second set share a common axis of rotation, and wherein the axis of rotation of the first set of rollers is separate to the axis of rotation of the second set of rollers.

In some embodiments, the tube cutter may comprise two forming rollers, wherein during a cutting operation, a first forming roller shares a common axis of rotation with at least one support roller, and wherein the second forming roller shares a common axis of rotation with a second support roller.

In some embodiments, at least one support roller comprises a ridged surface capable of forming a witness marking on a round tube during the cutting operation. Suitably, said ridged surface is capable of forming a line marking, a scratch marking, a dotted marking or a knurled marking on said round tube during the cutting operation.

As outlined above, the tube cutter may comprise a sliding guide, and the sliding guide may be configured to enable a movement of the at least one forming element as relates to the main body, in order to move the at least one forming element out of the starting position (A) against the force of the forming element spring.

The sliding guide may have at least one guide element, which can be moved along a guide surface, wherein the at least one forming element is arranged on the at least one guide element, particularly is rotatably mounted thereon, and the guide surface is assigned to the main body or to a sliding part assigned to the main body, and wherein the at least one guide element is supported against the forming element spring.

The tube cutter may comprise at least one support part, and the at least one forming element may be arranged on the at least one support part, particularly rotatably arranged thereon, wherein the at least one support part is movably guided over the sliding guide to the main body and is supported on the forming element spring via a linking point, particularly a single linking point. Suitably, the sliding guide may have at least one, preferably two, guide elements, each of which can be moved along a guide surface, wherein the guide elements are assigned to the at least one support part, and the corresponding guide surfaces are assigned to the main body, or, vice versa, the guide elements are assigned to the main body, and the corresponding guide surfaces are assigned to the at least one support part, and the at least one forming element is arranged between the guide elements.

The at least one forming element preferably has a circumferential protrusion on its outer circumference in order to achieve a forming effect.

The tube cutter may comprise more than one rotary guides, for example, one rotary guide may be provided to rotatably receive round tubes with an outer diameter from a first size range in the receiving area, and a further rotary guide, may be provided to rotatably receive round tubes with an outer diameter from a second size range in a further receiving area. The tube cutter may comprise a further forming element, which protrudes into the cutting plane or is at least positioned within the cutting plane and is configured to, act in a forming manner on the outer circumference of the round tube, in order to form a bevel or another type of contour, at an end of at least one of the tube parts created by the cut of the blade, by means of material displacement, during a cutting operation.

The cutting device may have a feed unit in order to displace the cutting part, as relates to the main body, in the direction of a receiving area for the round tube, particularly to set or reset the position of the blade The cutting part may comprise a cutting wheel, which forms the blade and is movable in order to roll off of the outer circumference of the round tube in a cutting manner.

According to one aspect, a method for cutting a round tube to length is provided, for example by means of the previously described tube cutter. In the method, a cutting movement is executed over the outer circumference of the round tube by means of a blade. In particular, in the method, a forming element, for example the previously described forming element, is moved over the outer circumference of the round tube by means of a movement associated with the cutting movement, in order to form a bevel or another type of contour, such as, for example, a fillet, at an end of at least one of the tube parts created by the cut of the blade, by means of material displacement. This results in the advantages previously mentioned in association with the tube cutter. In particular, the process of deburring is executed as early as the cutting process. No further work steps for the user are necessary in this regard.

BRIEF DESCRIPTION OF THE SEVERAL VIEWS OF THE DRAWINGS

Further details and features of the invention result from the following description of an exemplary embodiment by means of the drawing. The following is shown.

iii.

vii.

viii.

xii.

xiii.

xiv.

DETAILED DESCRIPTION OF THE INVENTION

Figure 1:
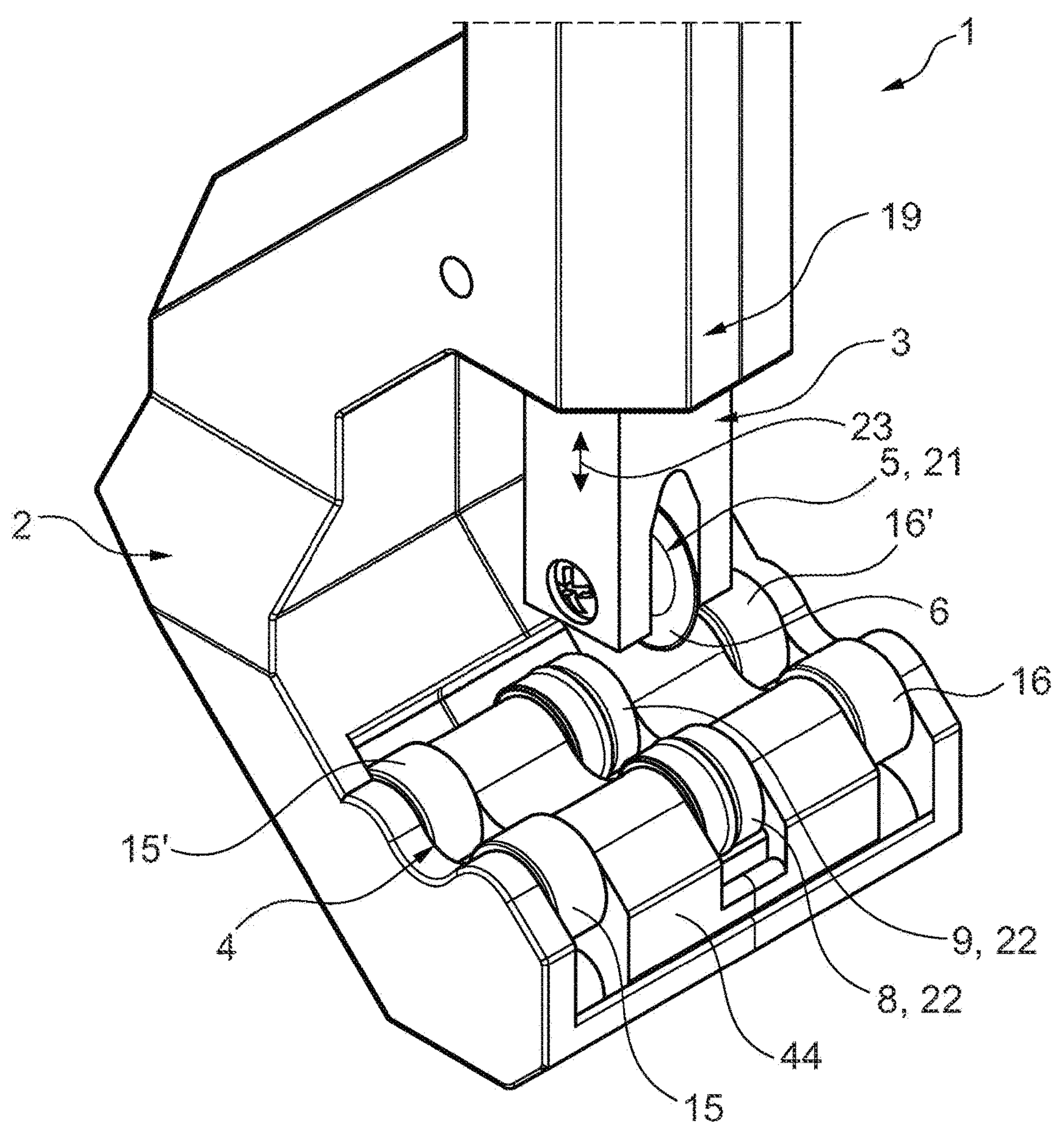
FIG. 1 a possible embodiment of a tube cutter for cutting round tubes, in a perspective view.
Figure 2:
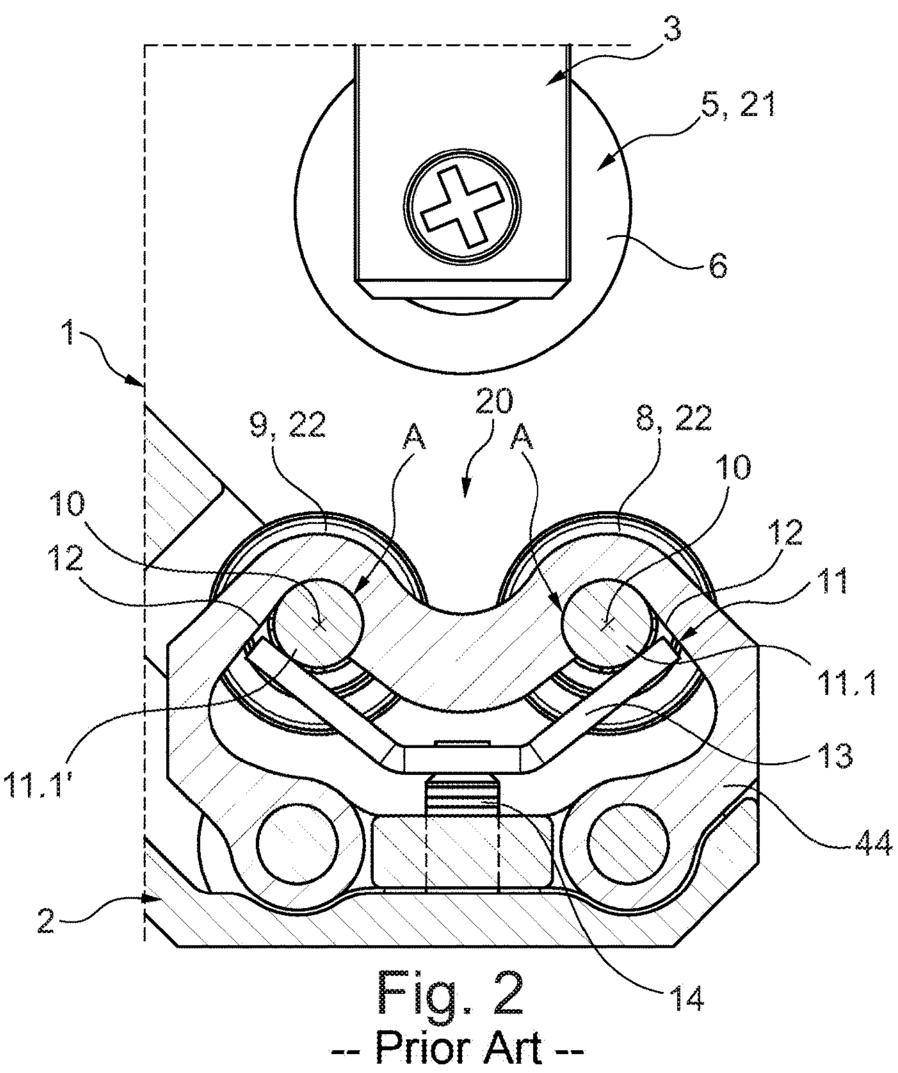
FIG. 2 the tube cutter according to FIG. 1, in a side view as a partial section.

FIGS. 1 and 2 show—in a schematic representation—a prior art embodiment of a tube cutter 1 in a perspective view (FIG. 1) and in a side view as a partial section (FIG. 2). FIGS. 1 and 2 each show a section of the tube cutter 1 in the region in which a round tube (which is not shown in FIGS. 1 and 2) is cut.

The round tube to be cut may be a copper tube or stainless steel tube. It may also be a tube made of C-steel. Basically, all form-stable tubes can be cut with the tube cutter 1. For example, plastic tubes can also be cut therewith. The round tubes which can be cut with the tube cutter 1 can be used in the HVAC and/or plumbing sectors, for example, to establish or route drinking water lines.

Figure 4:
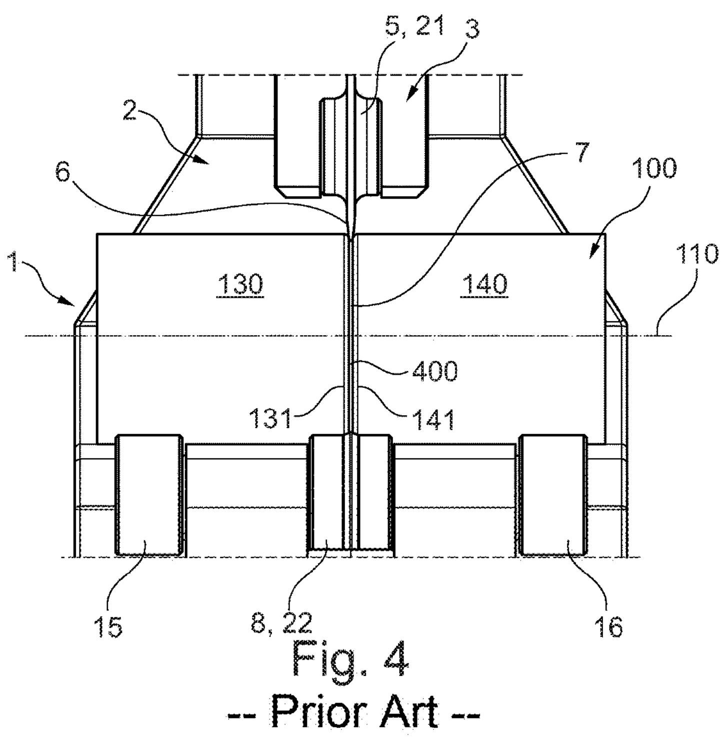
FIG. 4 the tube cutter from FIG. 1, in a front view, with an accommodated round tube, which has already been separated into two tube parts.
Figure 5:
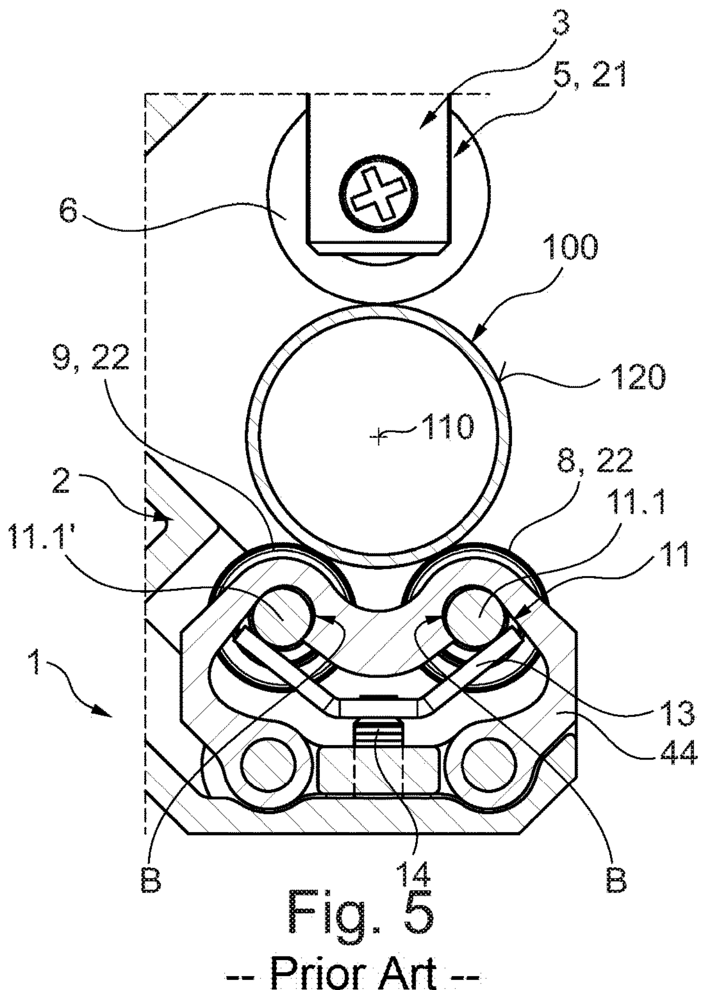
FIG. 5 the tube cutter from FIG. 1, together with a round tube, in a side view, as a partial section in a manner like FIG. 2.

The tube cutter 1 comprises a main body 2, a cutting device 3 assigned to the main body 2, and preferably a rotary guide 4 for the main body 3. FIGS. 4 and 5 each show the tube cutter 1 with an accommodated round tube 100, once in a front view of the tube cutter 1 (FIG. 4) and once in a side view as a partial section (FIG. 5). FIG. 4 shows the round tube 100 already in a cut state. For better understanding of the following description, reference is made to FIGS. 4 and 5.

The rotary guide 4 of the tube cutter 1 is preferably designed to rotatably receive the round tube 100 in a receiving area 20 in order to allow for a rotation, particularly a guided rotation, of the tube cutter 1 about the central axis 110 of the round tube 100, along its outer circumference 120. Preferably, the cutting device 3 has a cutting part 5 with a blade 6 lying in a cutting plane 7 and is preferably designed such that, with the rotation of the tube cutter 1 about the round tube 100, the blade 6 executes a circumferential cut 400 in the cutting plane 7

In the tube cutter 1, preferably at least one forming element 8 is provided, which protrudes into the cutting plane 7 and is designed such that, with a rotation of the tube cutter 1 about the round tube 100, it acts in a forming manner, for example, on the outer circumference 120 of the round tube 100, in order to form a bevel 131 or 141 or a curve, at an end of at least one of the tube parts 130, 140 created by the cut 400 of the blade 6, by means of material displacement or to execute at least one deburring process, for example, by means of material displacement.

Figure 3:
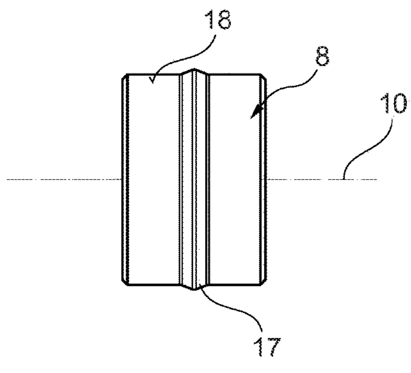
FIG. 3 a possible embodiment of a forming element which can be used in the tube cutter from FIG. 1 or from FIG. 6.

Preferably, the at least one forming element 8 has a rotation-symmetrical contour as relates to an axis of rotation 10. Preferably, the forming element 8 is formed as a forming roller 22. To this end, reference is also made to FIG. 3, in which the forming element 8 of the cutting device or of the tube cutter 1 is shown in an example in a side view.

Preferably, the at least one forming element 8 has a preferably circumferential protrusion 17 on its outer circumference 18 in order to achieve the targeted forming effect. The protrusion 17 preferably has a contour such that the targeted shaping, due to forming in the cutting area 7, of the end of the at least one tube part 130 or 140 is achieved.

For example, the protrusion 17 has a contour such that an end of both tube parts 130, 140 is formed in the same manner in order to create a bevel 131 or 141, for example with an incline of 20° or substantially 20°. Such a shaping or bevel facilitates damage-free mounting of a sealing O-ring on the respective tube part 130 or 140 when it is necessary to have a sealing fit with other tube parts or fittings in order to establish a tubing system.

Preferably, the at least one forming element 8 is arranged separately from the cutting part 5, particularly arranged spatially decoupled from the cutting part 5. For example, the at least one forming element 8 is integrated into the rotary guide 4. This can be implemented as follows: The rotary guide 4 has, for example, at least two support rollers 15, 16, which are rotatably mounted on the main body 2 and which extend, for example, with their respective axial extension transverse as relates to the cutting plane 7 and which are arranged, for example, one after the other as viewed in the direction transverse as relates to the cutting plane 7. When viewed in the direction transverse as relates to the cutting plane 7, the at least one forming element 8 is arranged, for example, between the at least two support rollers 15, 16.

As is particularly shown in FIGS. 2 and 5, the at least one forming element 8 is preferably designed to be moved out of a starting position A lying in the receiving area 20 for the round tube 100, against the force of a forming element spring 13, such that the at least one forming element 8 exerts a forming force due to the force of the forming element spring 13 when the round tube 100 is accommodated in the receiving area 20.

Preferably, the tube cutter 1 comprises a sliding guide 11. Preferably, the sliding guide 11 is designed to enable a movement of the at least one forming element 8 as relates to the main body 2 in order to move the at least one forming element 8 out of the starting position A, against the force of the forming element spring 13. To this end, the sliding guide 11 preferably has at least one guide element 11.1 which can move along a guide surface 12.

The at least one guide element 11.1 preferably rotatably accommodates the at least one forming element 8 and is preferably supported against the forming element spring 13, for example directly and/or proximately. The guide surface 12 is preferably formed on a sliding part 44 assigned to the main body 2. Preferably, the at least one guide element 11.1 is formed in the shape of a cylinder, for example shaped as a pin, and guided on the guide surface 12, preferably forcibly guided, for example, over its outer circumference.

FIG. 2 shows the at least one forming element 8 in the starting position A. The starting position A is the position of the at least one forming element 8 in which the tube cutter 1 is in the standby state, i.e. there is no round tube being accommodated there to be cut. Preferably, in the starting position A, the guide element 11.1 has contact with a section of the guide surface 12 which is used as a stop, in order to establish the starting position A for the at least one forming element 8.

In a cutting state of the tube cutter 1, in which a round tube or the round tube 100 is being accommodated, the at least one forming element 8 is moved in the direction away from the round tube 100, particularly moved downward, due to the cutting force exerted by the blade 6, as is shown in FIG. 5. The at least one forming element 8 is in an extended position B therein.

As is further evident from FIGS. 2 and 5, a positioning element 14, such as, for example, a screw element, may be provided, which exerts a positioning force onto the forming element spring 13. Due to the positioning element 14, the force of the forming element spring 13 can be set at a predefined value as relates to the starting position A of the at least one forming element 8.

As is further evident from FIGS. 1 and 2 as well as 4 and 5, the rotary guide 4 may have the support rollers 15, 16 in pairs. In this case, support rollers 15', 16', for example, are additionally provided. In addition to forming element 8, a further forming element 9 may also be provided in the same design. In this case, one of the forming elements 8, 9 can be respectively arranged between a set of support rollers 15, 16 or 15', 16'.

The sliding guide 11 may also be formed in a manner such that forming element 8 is guided over guide element 11.1, and the further forming element 9 can be guided over guide element 11.1' accordingly. To this end, the guide surface 12 of every single corresponding forming element 8 or 9 is formed, for example, such that a movement, particularly displacement, of the respective forming element 8 or 9 takes place, for example, in the radial direction as relates to the round tube 100, in order to establish the forming force The tube cutter 1 may be one which is guided by hand and/or actuated by hand. For example, the cutting device 3 has a feed unit 19, which is indicated, for example, in FIG. 1. By means of the feed unit 19, the cutting part 5 is displaced, as relates to the main body 2, in the direction of the receiving area 20 for the round tube 100 according to arrow 23, particularly the position of the blade 6 is set or reset The feed unit 19 may comprise a spindle drive, which can be actuated, for example, by hand in order to set the cutting part 5 in the direction of the round tube 100. Preferably, the cutting part 5 comprises a cutting wheel 21, which forms the blade 6 and is movable in order to roll off of the outer circumference 120 of the round tube 100 in a cutting manner.

Figure 6:
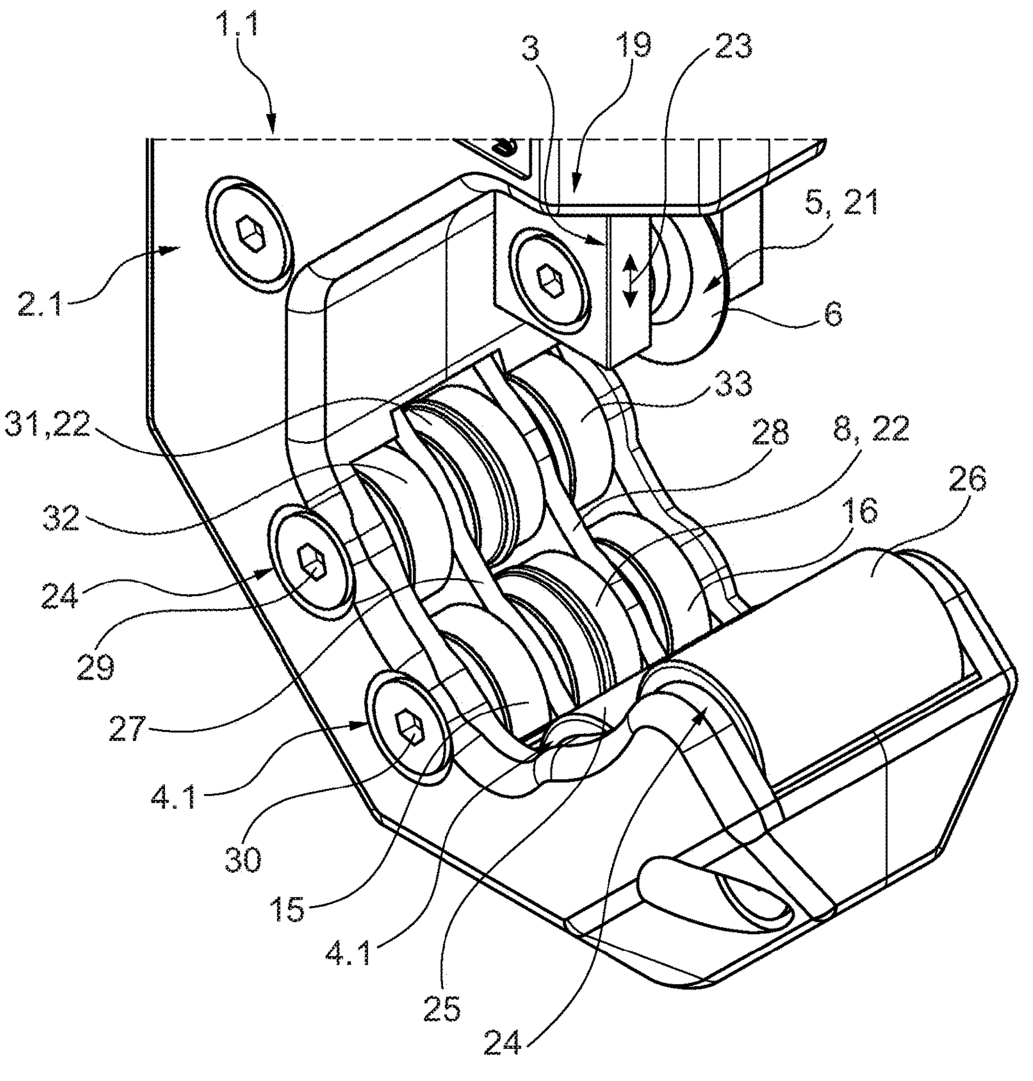
FIG. 6 a further possible embodiment of a tube cutter for cutting round tubes, in a perspective view.
Figure 7:
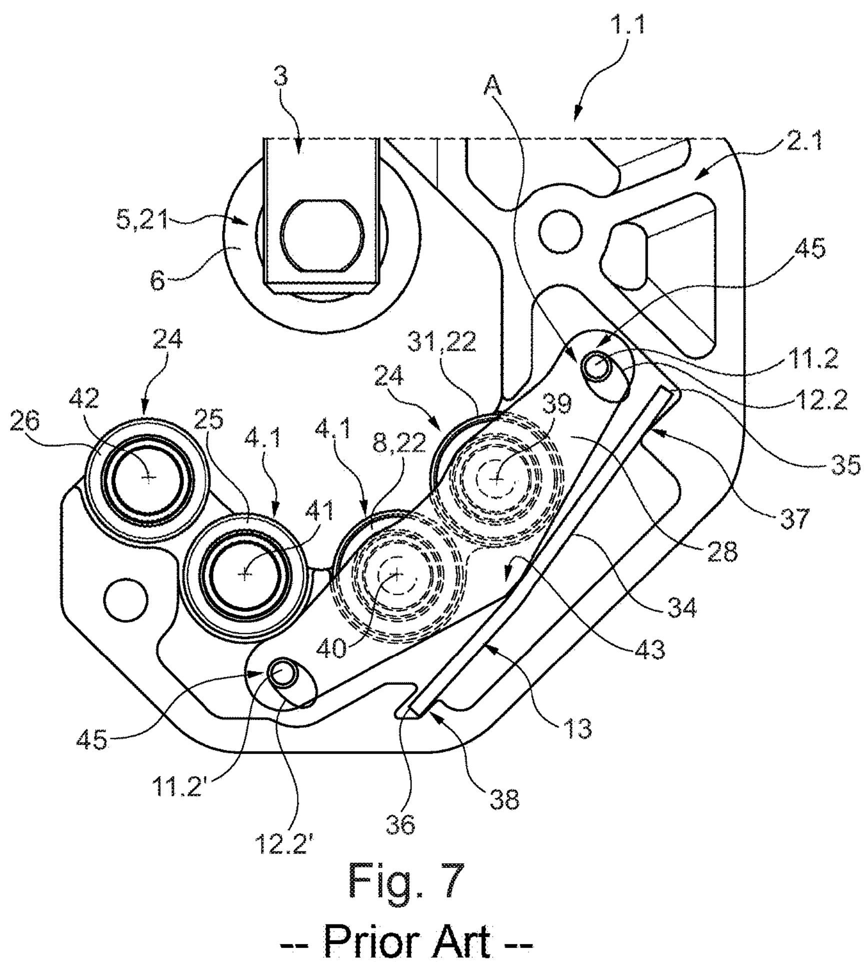
FIG. 7 the tube cutter according to FIG. 6, in a side view as a partial section.

FIG. 6 shows a further prior art embodiment of a tube cutter 1.1, in a perspective view. FIG. 7 shows the tube cutter 1.1 in a side view as a partial section. FIGS. 6 and 7 each show a section of the tube cutter 1.1 in the region in which a round tube (which is not shown in FIGS. 6 and 7) is cut. Components of the tube cutter 1.1 from FIGS. 6 and 7 which are structurally similar or functionally similar to components of the tube cutter 1 from FIGS. 1 and 2 have been given the same reference numerals; in this regard, reference is made to the description of the tube cutter 1 from FIGS. 1 and 2.

With the tube cutter 1.1 from FIGS. 6 and 7, the at least one forming element 8 is arranged on a support part 27, particularly rotatably mounted about an axis of rotation, in which the support part 27 is movably guided, over a sliding guide 45, to the main body and is supported on the forming element spring 13 via a preferably single linking point 43. The main body of tube cutter 1.1 has been given reference numeral 2.1 in FIGS. 6 and 7. Furthermore, the axis of rotation of the at least one forming element 8 has been given the reference numeral 40 in FIGS. 6 and 7.

In addition to support part 27, a further support part 28 is preferably provided which is preferably structurally similar or functionally similar to support part 27. Preferably, the at least one forming element 8 is supported, on the one hand, against the one support part which is 27 and, on the other hand, against the other support part which is 28; in particular, the at least one forming element 8 is rotatably mounted thereupon. For the sake of simplicity, reference is made to support part 28 in the following as an example in order to explain the functionality and/or the structure of the sliding guide 45

Preferably, the sliding guide 45 has two guide elements 11.2, 11.2', each of which is movable along a respective guide surface 12.2 or 12.2'. Preferably, guide elements 11.2, 11.2' are assigned to support part 28, and the corresponding guide surface 12.2 or 12.2' is respectively assigned to main body 2.1. For example, guide elements 11.2, 11.2 are arranged on support part 28, particularly formed thereupon, for example molded thereupon. For example, guide surface 12.2 or 12.2' is arranged on main body 2.1, particularly formed, for example molded or shaped, on main body 2.1.

Preferably, guide elements 11.2, 11.2' are formed in the shape of a cylinder and extend with their axial extension transverse as relates to the cutting plane 7, for example orthogonally as relates to the cutting plane 7. Preferably, the guide surfaces 12.2, 12.2' are each formed on a wall section of a recess or borehole or hole of the main body 2.1, into which the corresponding guide element 11.2 or 11.2' protrudes.

Preferably, the support part 28 has a longitudinal extension, which extends in the direction of the cutting plane 7. As is evident, for example, from FIG. 7, the at least one forming element 8 is preferably arranged between the guide surfaces 12.2, 12.2', as viewed in the direction of the cutting plane 7. In reference to the longitudinal extension of the support part 28, the guide elements 11.2, 11.2' and the at least one forming element 8 are arranged, for example, with their axial extension transverse as relates to the longitudinal extension of the support part 28, thus lying transverse as relates to the cutting plane 7.

The forming element spring 13 is preferably a leaf spring 34 with two ends 35, 36 positioned opposite one another. The leaf spring may be arranged on the main body 2.1 in a manner such that, for example, one of the ends 35, 36 is accommodated in a mount 38 on the main body 2.1, particularly accommodated loosely or under tension, and the other end 35 is supported on a material protrusion 37 of the main body 2.1. Preferably, the linking point 43 of the support part 28 is positioned against the forming element spring 13 in the area between the ends 35, 36.

The tube cutter 1.1 enables a machining of round tubes over a large area of differing tube diameter. To this end, the tube cutter 1.1 preferably has two rotary guides 4.1, 24. One or both rotary guides 4.1, 24 may be structurally similar or functionally similar to rotary guide 4 of tube cutter 1 from FIGS. 1 and 2; in this regard, reference is made to the description of tube cutter 1.

Figure 8:
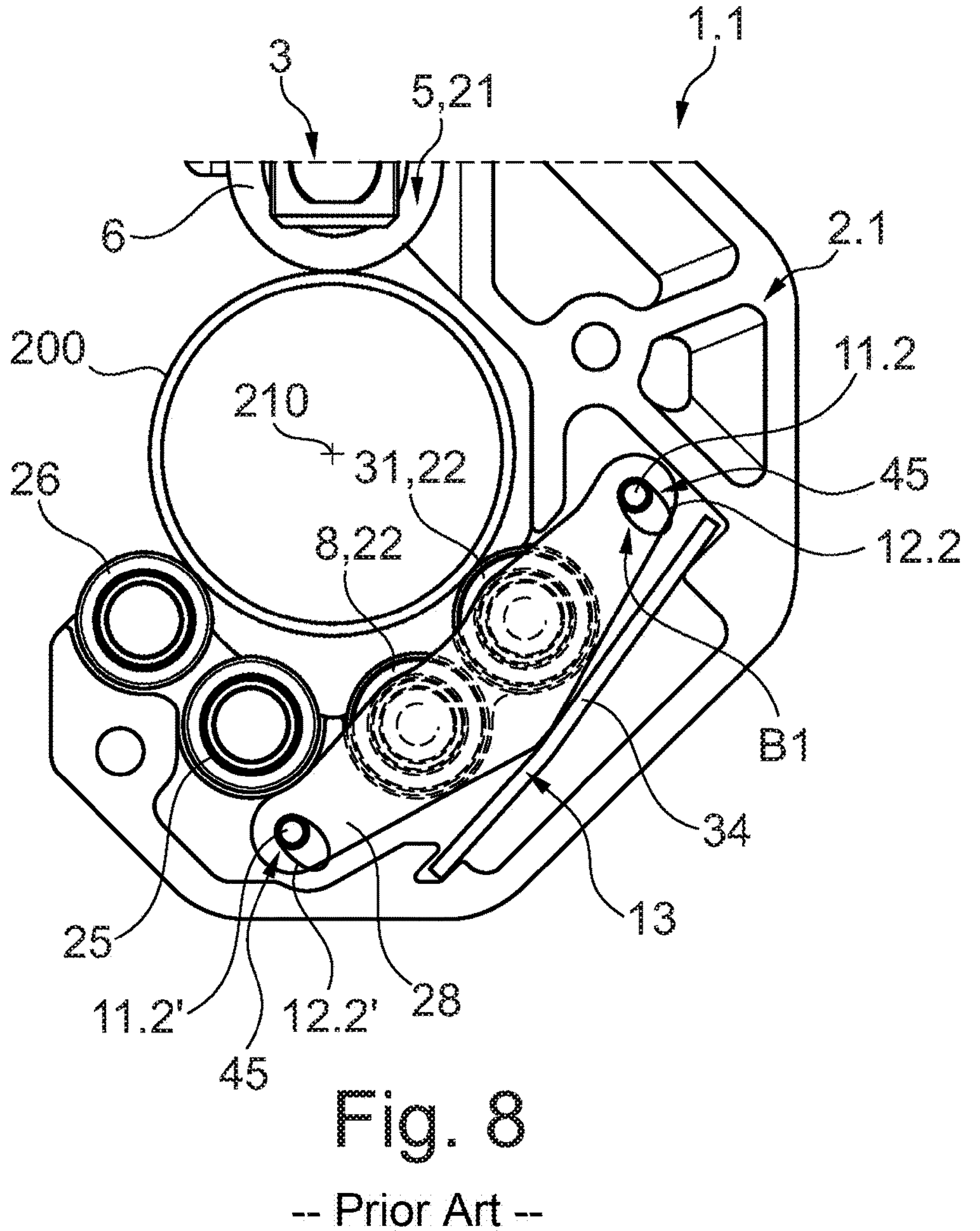
FIG. 8 the tube cutter from FIG. 6, together with a round tube of a first size class, in a side view, as a partial section in a manner like FIG. 7; and ix.
Figure 9:
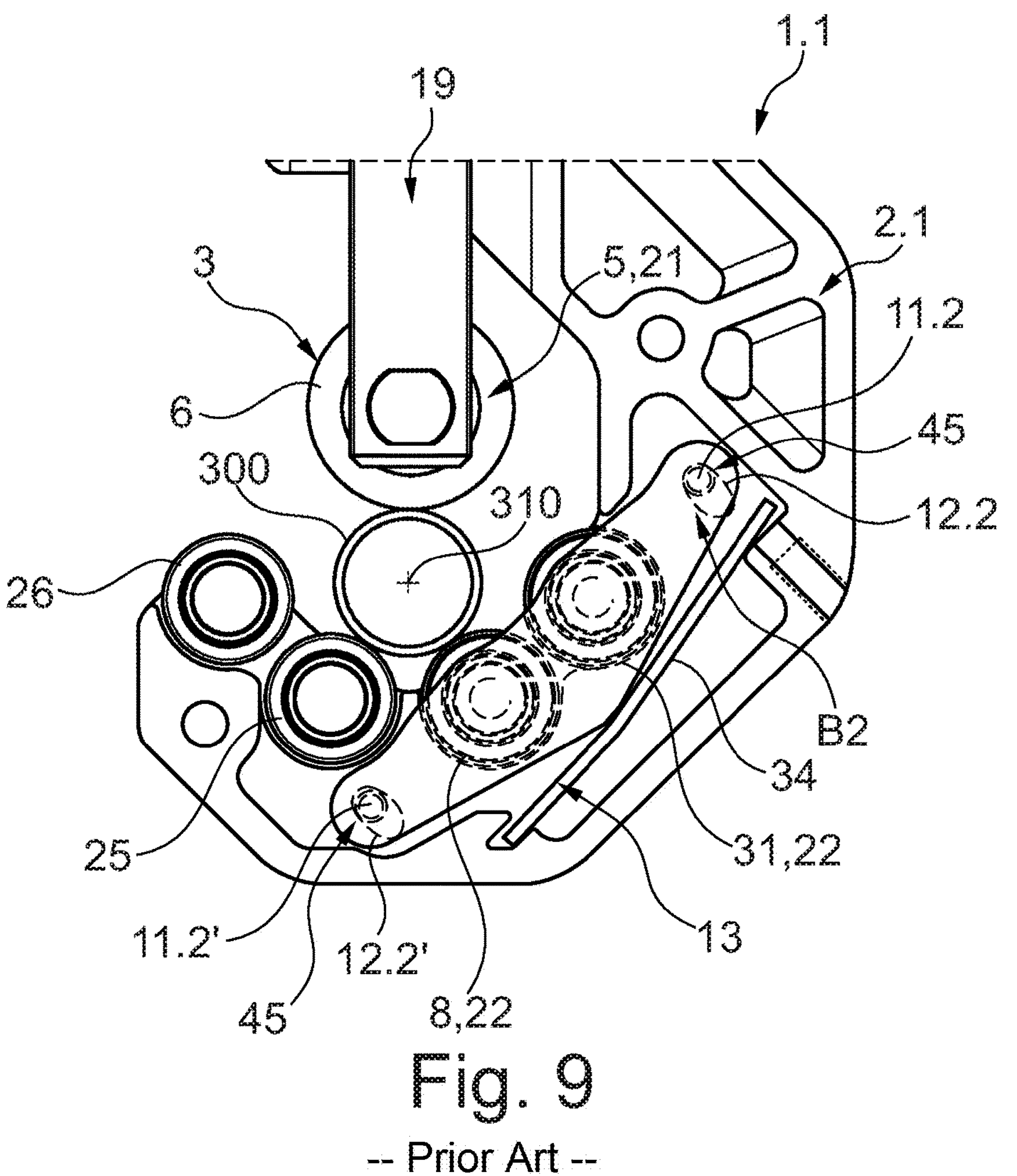
FIG. 9 the tube cutter from FIG. 6, together with a round tube of a second size class, in a side view, as a partial section in a manner like FIG. 7.

By means of rotary guide 4.1, round tubes with an outer diameter from a first size range can be accommodated, for example, in a first receiving area. By means of further rotary guide 24, round tubes with an outer diameter from a second size range can be rotatably accommodated, for example, in a second receiving area. Prior art FIGS. 8 and 9 show this by means of an example of two round tubes 200, 300 with outer diameters which are different from one another.

The two rotary guides 4.1 and 24 make it possible to rotate the tube cutter 1.1 about the central axis 210 or 310 of the respective round tube 200 or 300, and round tube 200 or 300 can be rotated along the respective outer circumference when respective round tube 200 or 300 is being accommodated in corresponding rotary guide 4.1 or 24.

For example, forming element 8 is assigned to rotary guide 4.1. A further forming element 31 is preferably provided which is, for example, structurally similar or functionally similar to forming element 8. It is preferably provided that the further forming element 31 protrudes into the cutting plane 7 or is at least positioned in the cutting plane 7.

Preferably, the further forming element 31 is designed such that, with a rotation of the tube cutter 1.1 about the round tube 200 accommodated in the further rotary guide 24, it acts in a forming manner on the outer circumference of the round tube 200, in order to form a bevel or another type of contour, such as, for example, a fillet, at an end of at least one of the tube parts created by the cut of the blade 6, preferably by means of material displacement The further forming element 31 is designed, for example, to be moved out of a starting position A lying in the receiving area for the round tube 200, against the force of the forming element spring 13 or of a further forming element spring such as, for example, a leaf spring, such that the further forming element 31 exerts a forming force due to the force of the forming element spring 13 when the round tube 200 is being accommodated in the further receiving area.

FIG. 6 shows forming element 8 and also further forming element 31 in the starting position A. In FIG. 8, the round tube 200 is accommodated in the further rotary guide 24, and the cutting part 5 is placed into the cutting position against the round tube 200. In this state, further forming element 31 is moved out of the starting position A, against the force of the forming element spring 13, into an extended position B1. FIG. 9 shows the state for rotary guide 4.1, in which the round tube 300 is being accommodated. Forming element 8 is moved out of the starting position A, against the force of the forming element spring 13, into an extended position B2.

Preferably, rotary guide 4.1 and further rotary guide 24 each have an additional support roller 25 or 26. Preferably, the additional support rollers 25, 26 are each rotatably mounted on the main body 2.1, about an axis of rotation 41 or 42, in which preferably axes of rotation 41, 42 extend transversely as relates to the cutting plane 7. As viewed in the direction transverse as relates to the cutting plane 7, the axis of rotation 39 of the further forming element 31 and the axis of rotation 42 of the additional support roller 26 of the further rotary guide 24 are arranged apart from one another. Preferably, the axis of rotation 40 of the forming element 8 and the axis of rotation 41 of the additional support roller 25 of the further rotary guide 24 are positioned in between.

Preferably, forming element 8 and further forming element 31 are the respectively single forming elements which are assigned to the respective rotary guide 4 or 24. The forming effect is created in this case thus exclusively by a single forming element.

Rotary guide 4.1 may have the at least two support rollers 15, 16, which is described, for example, for tube cutter 1 from FIGS. 1 and 2. The support rollers 15, 16 are rotatably mounted, for example, on the main body 2.1 about an axis of rotation 30 and are arranged to extend, for example, with their respective axial extension transverse as relates to the cutting plane 7, and are arranged, for example, one after the other as viewed in the direction transverse as relates to the cutting plane 7. When viewed in the direction transverse as relates to the cutting plane 7, the forming element 8 is arranged, for example, between the at least two support rollers 15, 16.

In a similar manner, the further rotary guide 24 has, for example, at least two support rollers 32, 33, which are rotatably mounted on the main body 2.1 about an axis of rotation 29 and which extend, for example, with their respective axial extension transverse as relates to the cutting plane 7, and which are arranged, for example, one after the other as viewed in the direction transverse as relates to the cutting plane 7. When viewed in the direction transverse as relates to the cutting plane 7, the further forming element 31 is arranged, for example, between the at least two support rollers 15, 16.

While a tube cutter of FIG. 1 for example, proved suitable for cutting round tubes of small diameter, such as a ¼ inch or ½ inch copper pipe (or stainless steel tubing), when round tubes of larger diameter were cut, occasionally, leak paths were formed adjacent the terminus of the cut tube. The present inventors discovered that said leak paths resulted from larger round tubes being somewhat unstable when gripped between the cutting device 3 and the forming rollers 22 of the tube cutter of FIG. 1, particularly at the beginning of the cutting operation.

Figures 2, 10:
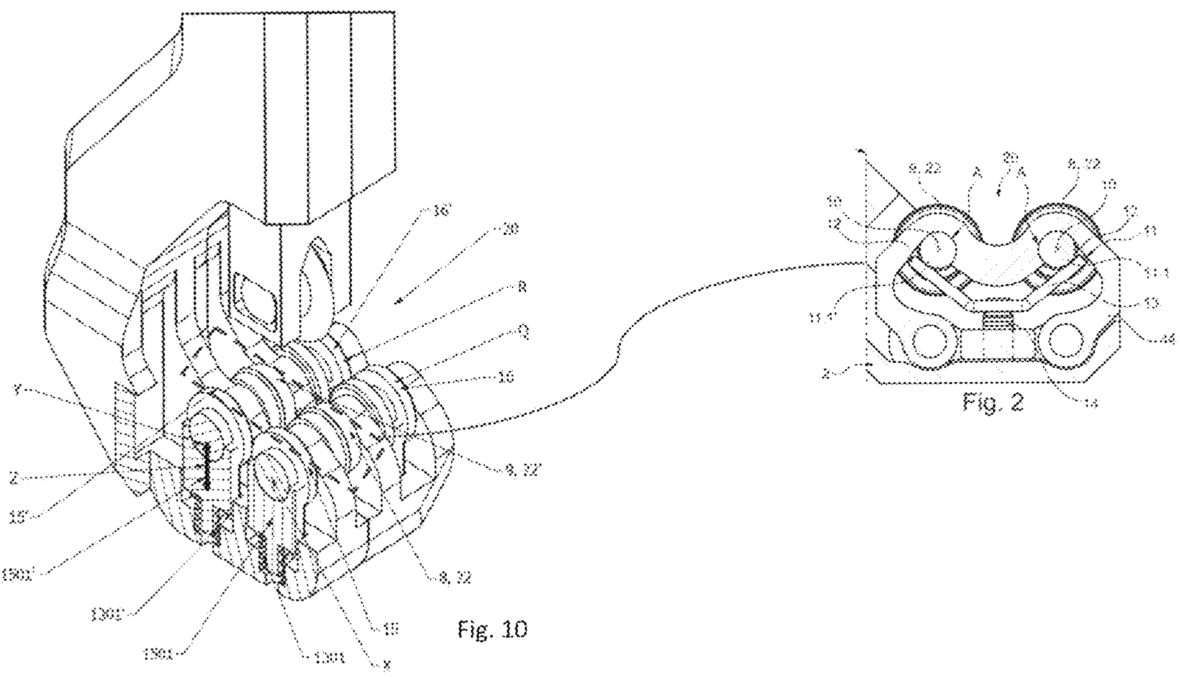
FIG. 10 shows an isometric view of a further embodiment of the invention.

FIG. 10 shows an isometric cut-away view of a further embodiment of the invention which addresses the aforementioned problem. The embodiment of FIG. 10, is similar to the embodiments in the previous figures albeit the support rollers 15, 15', 16, 16' are rotatably mounted on the main body 2, 2.1 by support roller biasing means. The embodiment of FIG. 10 has two forming rollers 22, 22'. The support rollers 15, 15', 16, 16' are movable from respective starting positions X, Y, Q, R. For example, the support rollers 15, 15', 16, 16' may move up and down in a vertical manner as illustrated by the double headed arrow Z in FIG. 10. The support rollers 15, 15', 16, 16' extend into the receiving area 20, at least partially beyond an outer diameter of the at least one forming roller 22, 22'.

The cut-away section of FIG. 10 shows support mounts 1501, 1501' which rotatably mount the support rollers 15, 15' to the main body via support roller biasing means, in the form of springs 1301, 1301 '. Sliding guides (not shown) associated with each support roller 15, 15' facilitate movement of the support mounts 1501, 1501' and support rollers 15, 15' from each of their respective starting positions. In said starting positions, the support rollers extend into the receiving area 20, at least partially beyond an outer diameter of the forming rollers 22, 22'. The springs 1301, 1301' may be compression springs. When a round tube is accommodated into the receiving area 20 of the tube cutter, the tube is supported by the support rollers prior to making contact with the forming rollers 22, 22' which facilitates optimal positioning of the tube prior to the cutting operation. The support rollers 15, 15' are movable from their respective starting positions X and Y by for example by compression of the springs 1301, 1301 '. The person skilled in the art will appreciate, that a similar arrangement of support mounts, sliding guides and springs may be arranged with respect to the other two support rollers 16, 16' shown in FIG. 10. This is the case for the embodiment of FIG. 10.

Advantageously, by the support rollers extending into the receiving area 20 at least partially beyond the outer diameter of the forming roller 22, 22', a tube placed in the receiving area will be initially supported by the support rollers, prior to engaging with the forming roller. This ensures optimal tube positioning is achieved prior to cutting. This is particularly advantageous for cutting tubes of larger diameter. The initial support provided by the support rollers 15, 15', 16, 16' precludes the tube 100 being initially positioned between the cutting device and the forming rollers, which can lead to a sub-optimal cut, and spiral groove formation adjacent the cutting point of the tube by the forming member.

Figure 15:
FIG. 15 shows a picture of a larger diameter cut tube where the support rollers were fixed.

This unwanted spiraling effect is shown in FIG. 15. The tube in FIG. 15 was cut using a tube cutter such as that shown in FIG. 1, i.e. a tube cutter wherein the position of the support rollers is fixed and wherein said support rollers are not mounted on support roller biasing means, and the support rollers cannot move from a starting position wherein the support rollers extend into the receiving area to a greater extent than the forming rollers.

Figure 11:
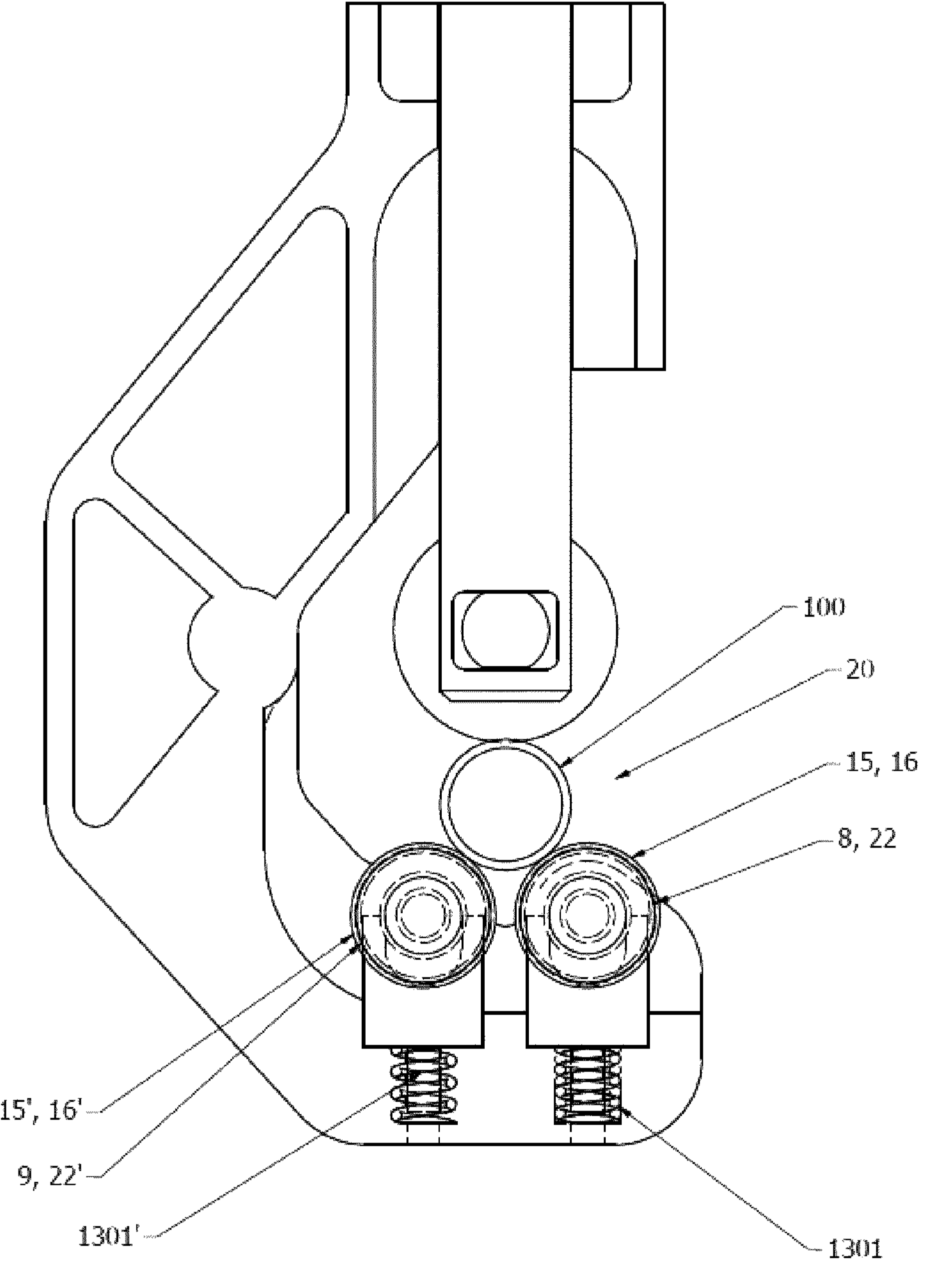
FIG. 11 shows a cross-sectional side on view transverse to the cutting plane with a round tube of smaller diameter accommodated in the receiving area.
Figure 12:
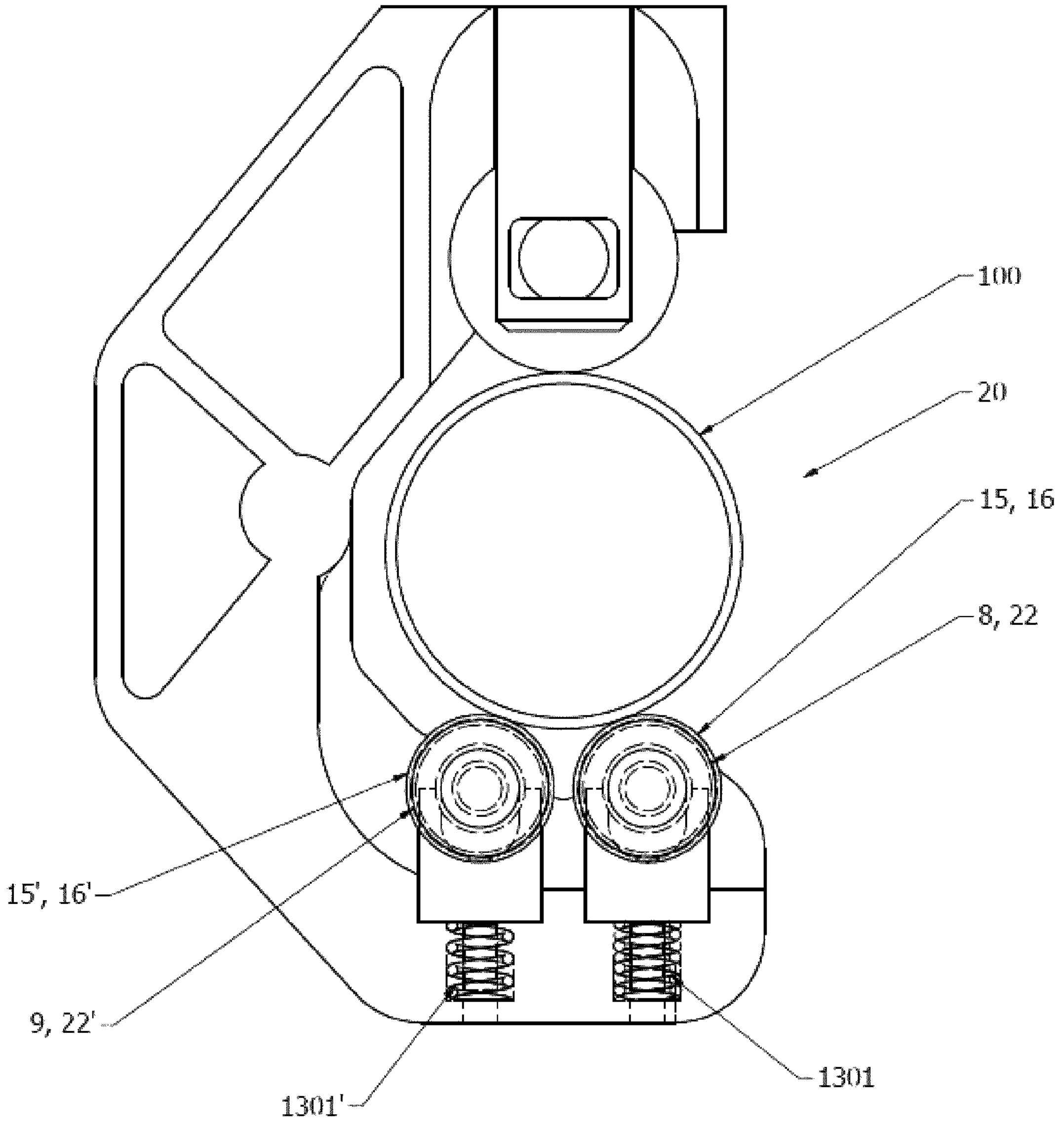
FIG. 12 shows a cross-sectional side on view transverse to the cutting plane with a round tube of larger diameter accommodated in the receiving area.

FIG. 11 is a cross-sectional view of a tube cutter as shown in FIG. 10, with a round tube 100 accommodated in the receiving area 20. The round tube 100 has a smaller diameter (e.g. a ¼ inch or ½ inch copper pipe). FIG. 12 is a cross-sectional view of a tube cutter as shown in FIG. 10, with a round tube 100 accommodated in the receiving area 20. The round tube 100 has a larger diameter (e.g. a ⅝ inch or ¾ inch or 1 inch copper pipe).

As shown in FIGS. 10 to 13, the support rollers are mounted via springs 1301, 1301' (support rollers 16, 16' are also mounted on springs not shown), which facilitate movement of the support rollers to a greater or lesser extent into and out of the receiving area 20. For example, in FIG. 10, the springs 1301, 1301' facilitate vertical movement along direction Z of support rollers 15, 15' into and out of the receiving area 20.

Figure 14:
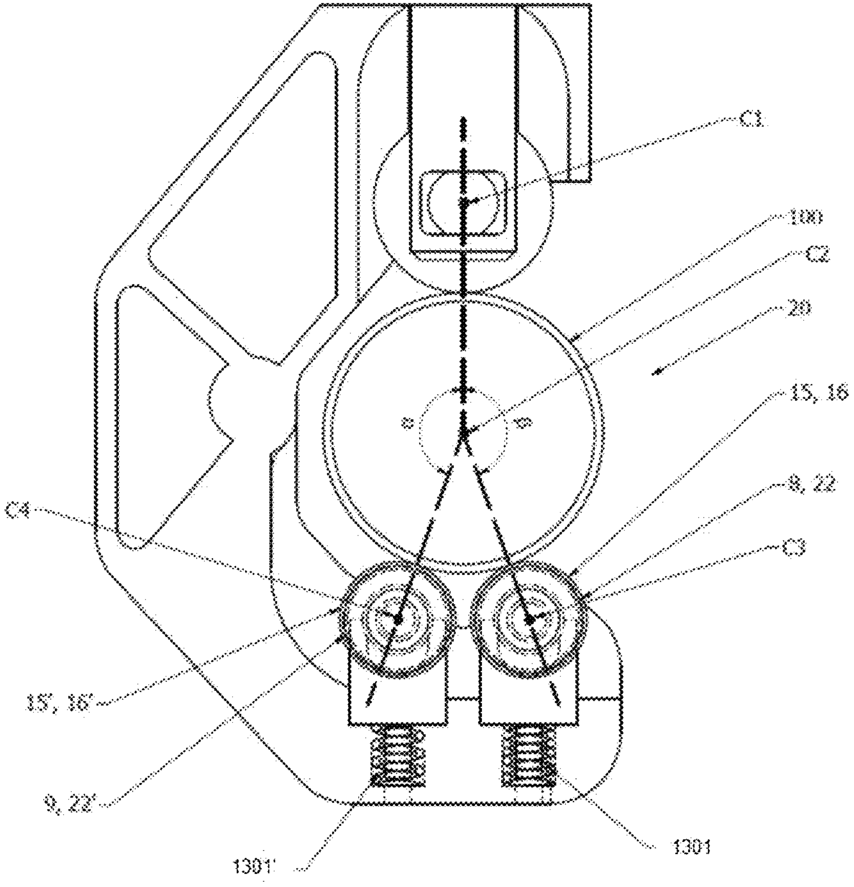
FIG. 14 shows the angular relationship between the support rollers, the forming rollers and the cutting device.

FIG. 14 shows the angles (a and 13) formed between a line extending from the axis of rotation of the cutting device c1 and the central axis c2 of the round tube accommodated in the receiving area 20, and a line formed between the central axis c2 of the round tube accommodated in the receiving area 20 and the axis of rotation of the forming roller c3, c4. Suitably, the angles a and 13 are obtuse angles, for example, a and 13 may each be in the range of from 110° to 170°, preferably in the range of from 120 to 160°. The forming rollers 22, 22' may be similarly positioned. Advantageously, such an arrangement of support rollers and forming rollers provides significant stability to a round tube to be cut when accommodated in the receiving area. The additional stability afforded to the round tube, makes the cutting operation more effective, so less force is required to be exerted through the cutting device and the forming element, to accomplish a cleanly cut tube, having a beveled and deburred terminus.

In FIG. 15, the spiral groove close to the terminus of the tube was formed by a forming roller of a tube cutter device which in contrast to the tube cutter of FIG. 10, does not comprise at least two support rollers mounted on support roller biasing means. The support rollers of the tube cutter used to cut the tube shown in FIG. 15 were in fixed positions i.e. said support rollers were not movable from a starting position whereby the support rollers extended into the receiving area 20 beyond the outer diameter of the forming roller in their starting position. The spiral groove occurred due to sub-optimal alignment of a round tube 100 in the receiving area 20 during the cutting operation. If a round tube 100 or pipe such as that shown in FIG. 15 is fitted in a plumbing connector, such as a compression fitting, the spiral groove may provide an unwanted leak path, below an O-ring seal in a compression fitting.

In contrast, in the tube cutter shown in FIGS. 10 to 14 which comprises at least two support rollers 15, 15', 16, 16' rotatably mounted on the main body by support roller biasing means (e.g. springs 1301, 1301'), and wherein said at least two support rollers 15, 15', 16, 16' are movable from respective starting positions X, Y, Q, R and wherein each of said at least two support rollers 15, 15', 16, 16' extends into the receiving area 20, at least partially beyond an outer diameter of the each of the forming rollers 22, 22', no spiraling is observed.

In FIG. 10, the receiving area 20 is free of a round tube 100. Accordingly, the at least two support rollers 15, 15', 16, 16' will extend into the receiving area at least partially beyond an outer diameter of each of the forming rollers 22, 22', i.e. the at least two support rollers 15, 15', 16, 16' are in their starting positions X, Y, Q, R.

In the embodiment shown in FIGS. 11 to 14, a round tube 100 is accommodated in the receiving area 20 to be cut, and therefore the round tube 100 is gripped between the cutting device, and the support rollers 15, 15', 16, 16' and the forming rollers 22, 22' can act in a forming manner on the outer circumference 120 of the round tube 100, in order to form a bevel 131; 141 or another type of contour at an end of at least one of the tube parts 130, 140, created by the cut 400 of the blade 6, by means of material displacement. As will be clear to the person skilled in the art, during the cutting operation, when the forming rollers are forming the bevel, the support rollers 15, 15', 16, 16' will be displaced from their starting positions X, Y, Q, R. In the embodiments shown in FIGS. 11 to 14, when the round tube 100 is accommodated in the receiving area 20 and throughout the cutting operation, force is exerted by the compressed springs e.g. 1301, 1301' and other springs on which the other support rollers 16, 16' are mounted (not shown) through said support rollers on said round tube 100, which stabilizes the round tube 100 within the receiving area 20 during the cutting operation.

Figure 13:
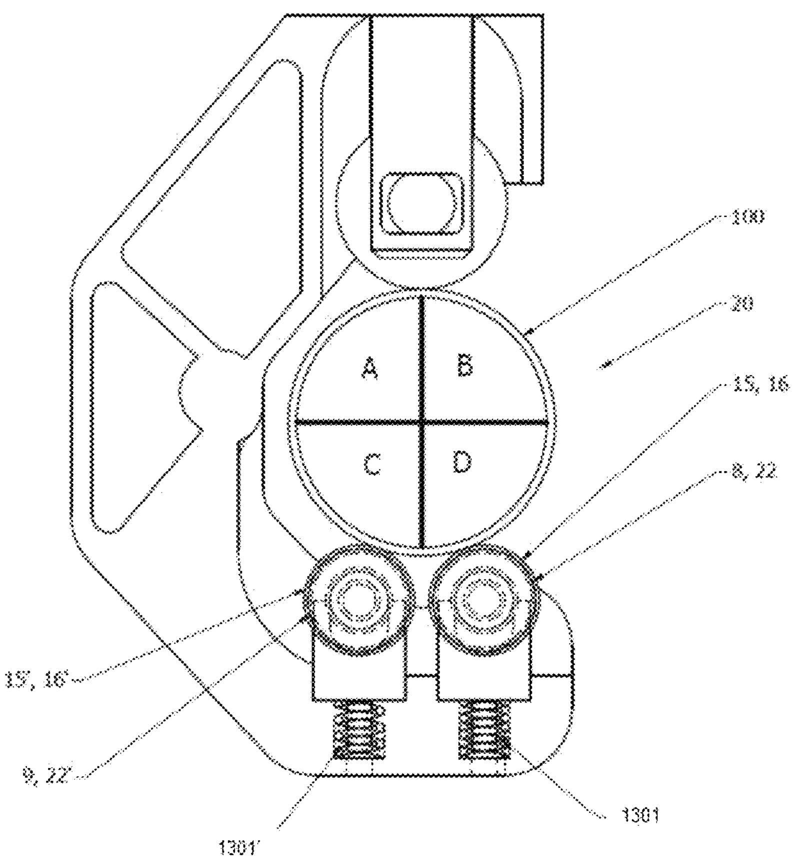
FIG. 13 is a cross-sectional view showing the relative positioning of the point of contact of the cutting device, the forming rollers and the support rollers with respect to a round tube accommodated in the receiving area.

In the embodiments shown in FIGS. 11 to 14, which comprise two forming rollers 22, 22' and two sets of support rollers 15, 15', 16, 16', a round tube 100 accommodated in the receiving area during a cutting operation is particularly stable. This arrangement results in a particularly clean cut, with a bevel end on each cut end. FIG. 13 shows two support rollers 15, 16 and one forming roller 22 arranged to engage with the same cross-sectional quadrant D of the round tube 100. Similarly, the two support rollers 15', 16' and one forming roller 22' are arranged to engage with the same cross-sectional quadrant C of the round tube 100. The cutting device and the support rollers are substantially circumferentially disposed in a spaced apart manner about the receiving area 20. The forming rollers 22, 22' and support rollers 15, 15', 16, 16' are arranged in the receiving area 20 such that they each face the cutting device.

The presence of two forming rollers in close proximity for example as is shown in FIGS. 10 to 14, results in an improved bevel, free from burrs which could damage an O-ring seal in a compression fitting.

In the present description, the reference to a certain aspect or a certain embodiment or a certain design indicates that a certain feature or a certain property, which is described in connection with the respective aspect or the respective embodiment or the respective design, is at least contained therein but does not necessarily have to be contained in all aspects or embodiments or designs of the invention. Express reference is made to the extent that each combination of various features and/or structures and/or properties, which are described in reference to the invention, are comprised by the invention, provided this is not expressly or clearly contradicted by said connection.

The use of individual or all examples or an exemplary expression in the text is intended solely to explain the invention and does not represent any limitation with respect to the scope of the invention unless otherwise claimed. In addition, no expression or wording of the description should be understood to the extent that it is a non-claimed element that is essential for execution of the invention.

LIST OF REFERENCE NUMERALS

1 Tube cutter
1.1 Tube cutter
2 Main body
2.1 Main body
3 Cutting device
4 Rotary guide
4.1 Rotary guide
5 Cutting part
6 Blade
7 Cutting plane
8 Forming element
9 Forming element
10 Axis of rotation
11 Sliding guide
11.1 Guide element
11.2 Guide element
11.1' Guide element
11.2' Guide element
12 Guide surface
12.2 Guide surface
12.2' Guide surface
13 Forming element spring
14 Positioning element
15 Support roller
15' Support roller
16 Support roller
16' Support roller
17 Protrusion
18 Outer circumference
19 Feed unit
20 Receiving area
21 Cutting wheel
22 Forming roller
22' Forming roller
23 Arrow
24 Further rotary guide
25 Additional support roller
26 Additional support roller
27 Support part
28 Support part
29 Axis of rotation
30 Axis of rotation
31 Further forming element
32 Support roller
33 Support roller
34 Leaf spring
35 End
36 End
37 Material protrusion
38 Mount
39 Axis of rotation
40 Axis of rotation
41 Axis of rotation
42 Axis of rotation
43 Linking point
44 Sliding part
45 Sliding guide
100 Round tube
110 Central axis
120 Outer circumference
130 Tube part
131 Bevel

140 Tube part
141 Bevel
200 Round tube
210 Central axis
300 Round tube
310 Central axis
400 Cut
1301 spring
1301' spring
1501 Support mount
1501' Support mount
A Starting position
B Extended position
B1 Extended position
B2 Extended position
X Starting position
Y Starting position
Q Starting position
R Starting position
Z vertical movement

The invention claimed is:

1. A tube cutter for cutting a round tube to form two tube parts, comprising a main body comprising a cutting device and a rotary guide, wherein the rotary guide is configured to rotatably accommodate the round tube in a receiving area, to permit rotation of the tube cutter about the central axis of the round tube along an outer circumference of said round tube, wherein the cutting device comprises a blade lying/disposed in a cutting plane and is configured to execute a circumferential cut in the cutting plane, and wherein the tube cutter further comprises at least one forming element, which protrudes into the cutting plane or is positioned at least in the cutting plane and is configured to form a circumferential bevel or another type of circumferential contour at an end of at least one of the tube parts, by means of material displacement, wherein the at least one forming element is separated/spaced from the cutting device, wherein the at least one forming element is a forming roller, wherein the tube cutter comprises at least one forming element spring, and the at least one forming element is configured to be moved out of a starting position (A) lying in the receiving area for the round tube, against the force of the at least one forming element spring, such that the at least one forming element is configured to exert a forming force due to the force of the forming element spring, when the round tube is accommodated in the receiving area;

wherein the at least two support rollers are rotatably mounted on the main body by support roller biasing means, which is different from the at least one forming element spring; and wherein said at least two support rollers are movable from respective starting positions (X and Y) within the receiving area and wherein each of said at least two support rollers extend into the receiving area, at least partially beyond an outer diameter of the at least one forming roller when in said starting positions (X and Y).

2. The tube cutter according to claim 1, wherein the at least two support rollers are arranged with each of their axial extensions respectively transverse as related to the cutting plane.

3. The tube cutter according to claim 1, wherein the at least two support rollers comprises four support rollers.

4. The tube cutter according to claim 1, wherein the at least two support rollers are rotatably mounted on opposing sides of the cutting plane.

5. The tube cutter according to claim 1, wherein the at least two support rollers are arranged to support a round tube accommodated in the receiving area by supporting adjacent cross-sectional quadrants of said round tube.

6. The tube cutter according to claim 1, wherein the at least two support rollers are arranged to support a round tube in the receiving area by supporting the same cross-sectional quadrant of said tube.

7. The tube cutter according to claim 1, wherein the at least one forming roller is rotatably mounted between at least two support rollers.

8. The tube cutter according to claim 1, wherein the at least one forming roller comprises two forming rollers.

9. The tube cutter according to claim 1, wherein an axis of rotation of the at least one forming roller lies within the diameter of each of the at least two support rollers.

10. The tube cutter according to claim 1, wherein an axis of rotation of the at least one forming roller lies within the diameter of each of the at least two support rollers which form a first set of support rollers, and the axis of rotation of a second forming roller lies within the diameter of each of the at least two support rollers which form a second set of support rollers, wherein the first set of support rollers is arranged to support one cross-sectional quadrant of said round tube, and the second set of support rollers is arranged to support a second adjacent cross-sectional quadrant of said round tube.

11. The tube cutter according to claim 1, wherein the force exertable by the at least one forming spring element on the at least one forming roller is greater than the force exertable by the support roller biasing means on the at least two support rollers.

12. The tube cutter according to claim 1, wherein each support roller is mounted on separate support roller biasing means.

13. The tube cutter according to claim 1, comprising at least two support rollers, wherein said at least two support rollers are mounted on a common/single support roller biasing means.

14. The tube cutter according to claim 1, wherein the at least two support rollers comprises four support rollers, wherein two of the support rollers are mounted on a first support roller biasing means, and two of the support rollers are mounted on a second support roller biasing means.

15. The tube cutter according to claim 1, wherein the at least two support rollers are mounted on the main body facing the cutting device, wherein a point of contact of the cutting device with a round tube accommodated in the receiving area is separate from the cross-sectional quadrants wherein said support rollers support said round tube.

16. The tube cutter according to claim 1, wherein the cutting device and support rollers are circumferentially disposed in a spaced apart manner about the receiving area.

17. The tube cutter according to claim 1, comprising two sets of said at least two support rollers wherein the at least two support rollers of the first set share a common axis of rotation, and the at least two support rollers of the second set share a common axis of rotation, and wherein the axis of rotation of the first set of rollers is separate to the axis of rotation of the second set of rollers.

18. The tube cutter according to claim 1, wherein the at least one forming roller comprises two forming rollers, wherein during a cutting operation, a first forming roller shares a common axis of rotation with at least one support roller, and wherein the second forming roller shares a common axis of rotation with a second support roller.

19. The tube cutter according to claim 1, wherein at least one of the at least two support rollers comprises a ridged surface capable of forming a witness marking on a round tube during the cutting operation.

20. A method for cutting a round tube to length to form two tube parts comprising:

(i) Accommodating the round tube in the receiving area of the tube cutter of claim 1, (ii) Cutting the round tube to form two tube parts by executing a circumferential cut in the round tube with the tube cutter.

* * * * *